Figure 1:
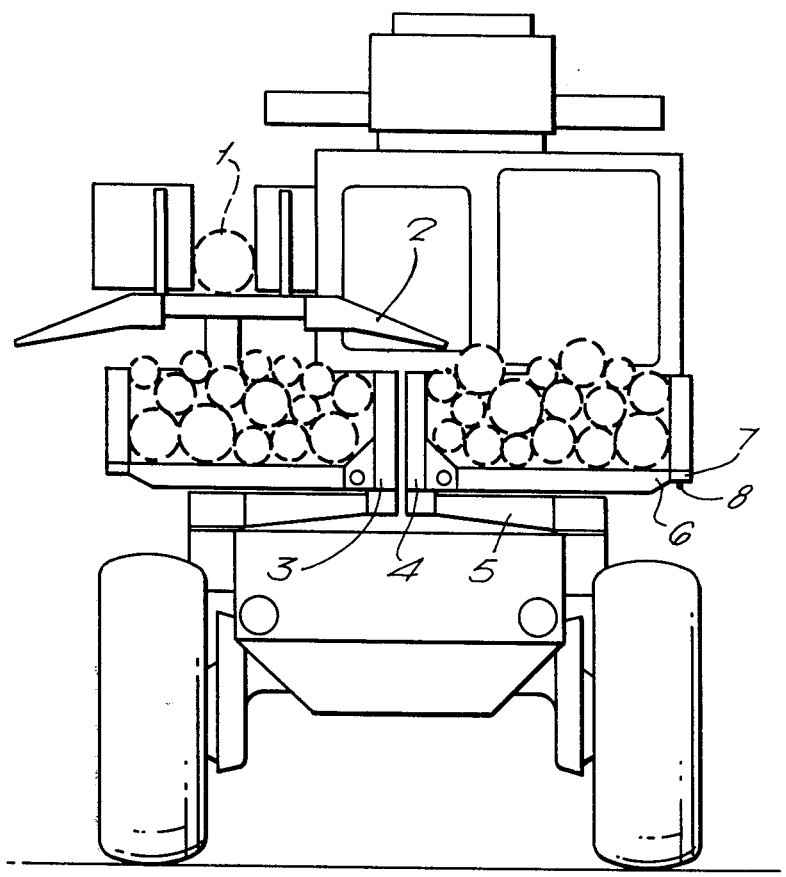

United States Patent [19]

Kaarnametsä

[11] 4,119,222
[45] Oct. 10, 1978

[54] TREE HARVESTING APPARATUS

[75] Inventor: Matti Kaarnametsä, Tampere, Finland

[73] Assignee: Rauma-Repola Oy, Finland

[21] Appl. No.: 646,578

[22] Filed: Jan. 5, 1976

[30] Foreign Application Priority Data

Jan. 16, 1975 [FI] Finland ............................ 750108

[51] Int. Cl.² .............................................. B60P 1/00
[52] U.S. Cl. ............................ 214/83.24; 298/8 R; 298/8 H; 298/29; 214/151
[58] Field of Search ............ 214/83.24, 500, 660, 214/151, DIG. 10, 3.4, 307, 313, 1 BB, 1 BC, 515; 298/8 R, 31, 13 R, 8 H, 9, 29, 1 A, 12, 13, 1 B, 29, 18; 105/381–387, 260, 262, 263

[56] References Cited

U.S. PATENT DOCUMENTS

| | | | |
|---|---|---|---|
| 707,927 | 8/1902 | Hoffman | 214/1 GD |
| 717,293 | 12/1902 | Smith | 298/8 R |
| 823,079 | 6/1906 | Rais | 298/9 |
| 1,170,654 | 2/1916 | Martin | 214/95 R |
| 2,284,187 | 5/1942 | Crosby | 214/83.24 |
| 2,515,334 | 7/1950 | Buye et al. | 214/82 |
| 2,752,056 | 6/1956 | Lull | 214/660 |
| 3,452,887 | 7/1969 | Larson et al. | 214/80 |
| 3,643,825 | 2/1972 | Zane, Jr. | 214/DIG. 3 |
| 3,944,097 | 3/1976 | Savage | 214/82 |
| 3,998,345 | 12/1976 | Fiehler et al. | 214/730 |

FOREIGN PATENT DOCUMENTS 399,203 1/1963 Switzerland ............................ 298/9

*Primary Examiner*—Drayton E. Hoffman
*Assistant Examiner*—Lawrence E. Williams
*Attorney, Agent, or Firm*—Burns, Doane, Swecker & Mathis

[57] ABSTRACT

A tree harvesting apparatus is provided with at least one movable pocket mounted on a vehicle for collecting cut trees. Each pocket extends parallel to the advancing direction of the apparatus and is movable in a horizontal plane, by means of a lever system, in a lateral direction. The pocket is arranged to move far enough horizontally to a position outside the profile of the apparatus, or, at least, to clear the outer edge of the wheels of the vehicle. In that position the trees can be dropped to the ground at the side of the apparatus.

3 Claims, 7 Drawing Figures

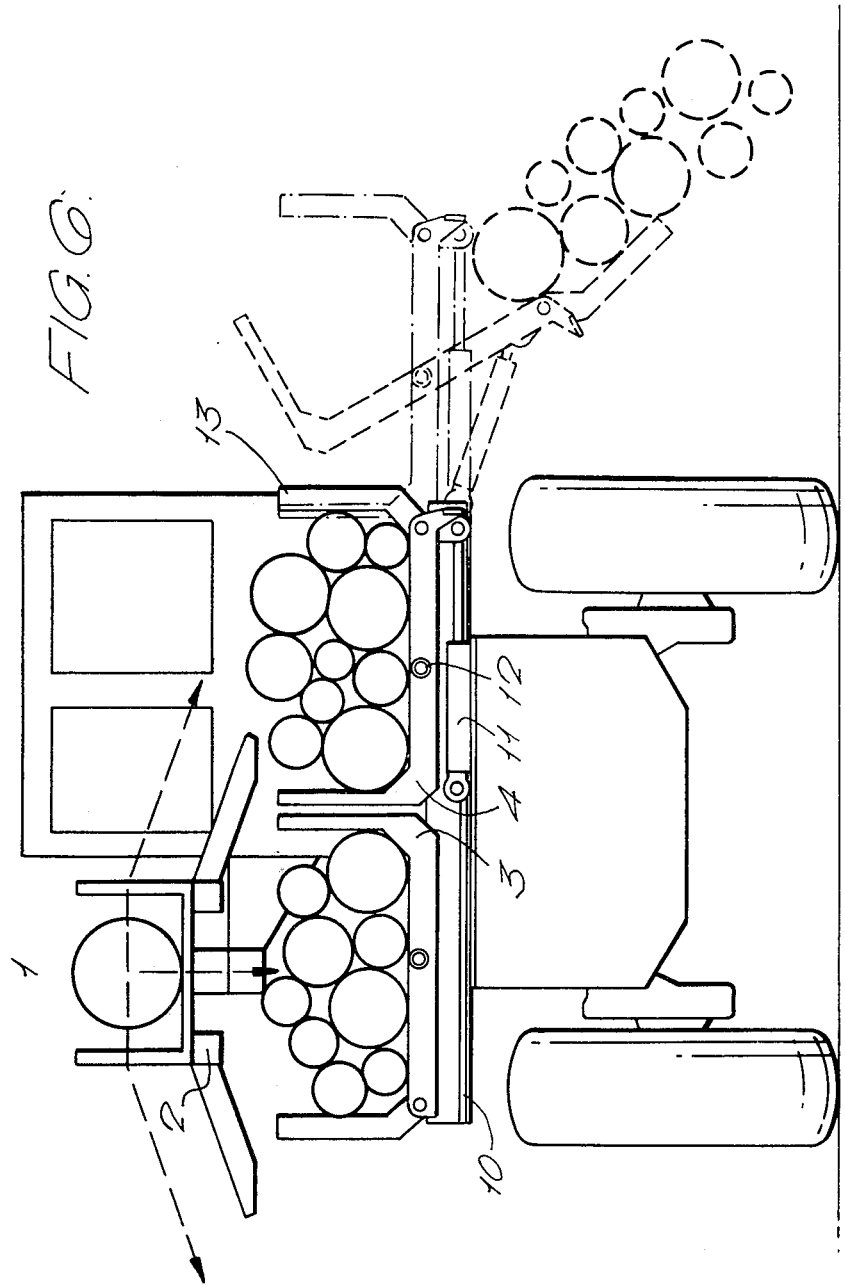

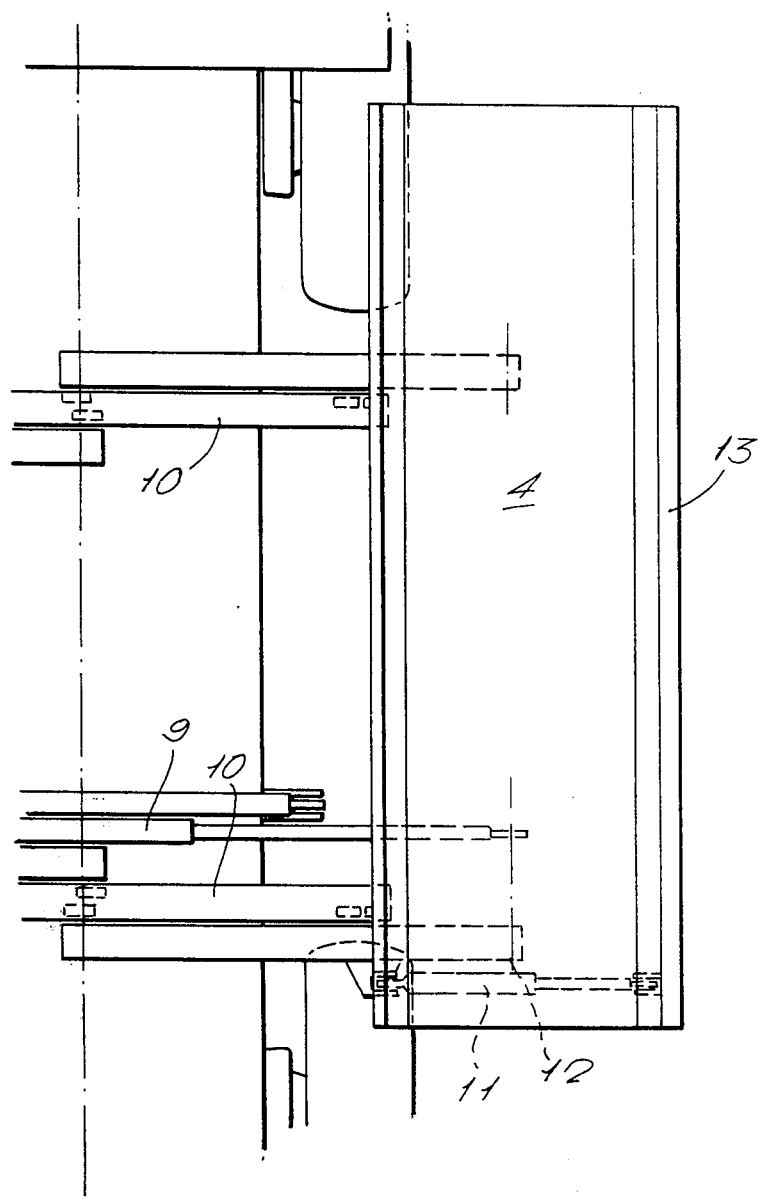

TREE HARVESTING APPARATUS

This invention relates to a tree harvesting apparatus provided with one or several tree collecting devices or pockets, each pocket consisting of at least side walls or piles and a bottom and means for emptying the pocket.

In tree harvesting apparatuses, the sorting and the piling of trees near the passage of the harvesting apparatus is one operation of the handling. This makes the operation of a load carrying machine easier and faster. The sorting is carried out by arranging part of the trees directly onto the ground and part into one or several collecting devices of so called pockets. By means of these pockets, trees are brought into small piles along the passage by dropping or otherwise depositing the tree lot in a pocket onto the ground surface. Pockets used today are mainly of two types classed according to their operating direction; mainly pockets operating approximately transversely to the advancing direction of the apparatus and pockets operating parallel to the advancing direction of the apparatus. The advancing direction is usually defined by the direction of the tree handling line. Pockets operating parallel to the advancing direction of the apparatus. The advancing direction is usually defined by the direction of the tree handling line. Pockets operating in the advancing direction of the apparatus are usually emptied by means of lever systems acting in the vertical direction. Both ends of the pockets are fixed, or the system otherwise essentially restricts the length of trees to be collected into the pocket.

The system in accordance with the present invention operates in the advancing direction of the apparatus. The pocket is emptied by moving the whole pocket in a horizontal plane, or one slightly deviating from a horizontal plane, to a position outside the chassis and the wheels of the apparatus where an openable, bottom of a known kind or a tiltable pocket lets the tree lot fall onto the ground.

A tree harvesting apparatus according to the invention is mainly characterized in that each pocket is arranged to be movable, substantially in a horizontal plane to one side of the tree harvesting apparatus over those wheels of the apparatus which are on the same side as the pocket. This movement is as far as outside the outer edge of the said wheels, in which position the tree lot in the pocket can be dropped onto the ground, on the side of the passage of the tree harvesting apparatus, through an openable bottom of a known kind, or by tilting the pocket. Due to the horizontal movement or movement slightly deviating from horizontal, relatively little driving power is required. Furthermore, movement in this direction makes it is easy to avoid the wheels of the apparatus which often restrict movements in vertical plane because of their big size and movability. In addition, one or both ends of the pocket of the present invention are open so that the structure does not set any essential restrictions as to the length of trees to be collected in the pocket.

Figure 2:
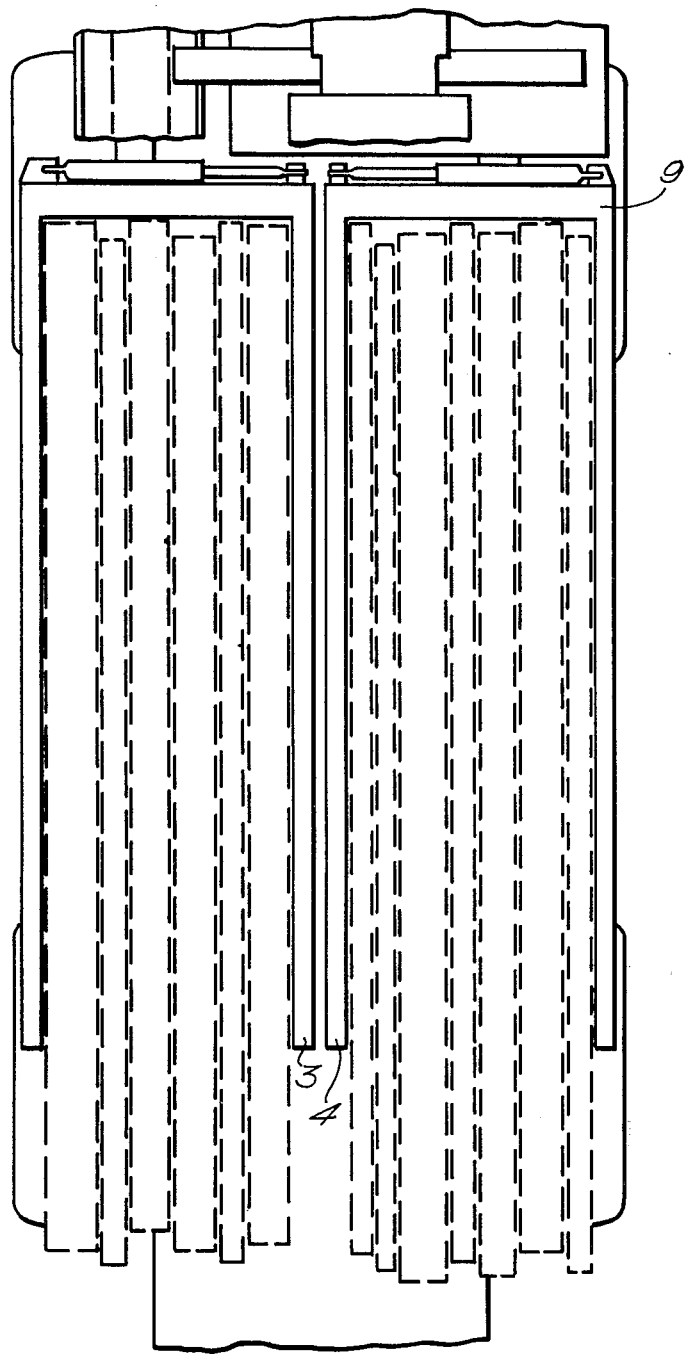
Figure 3:
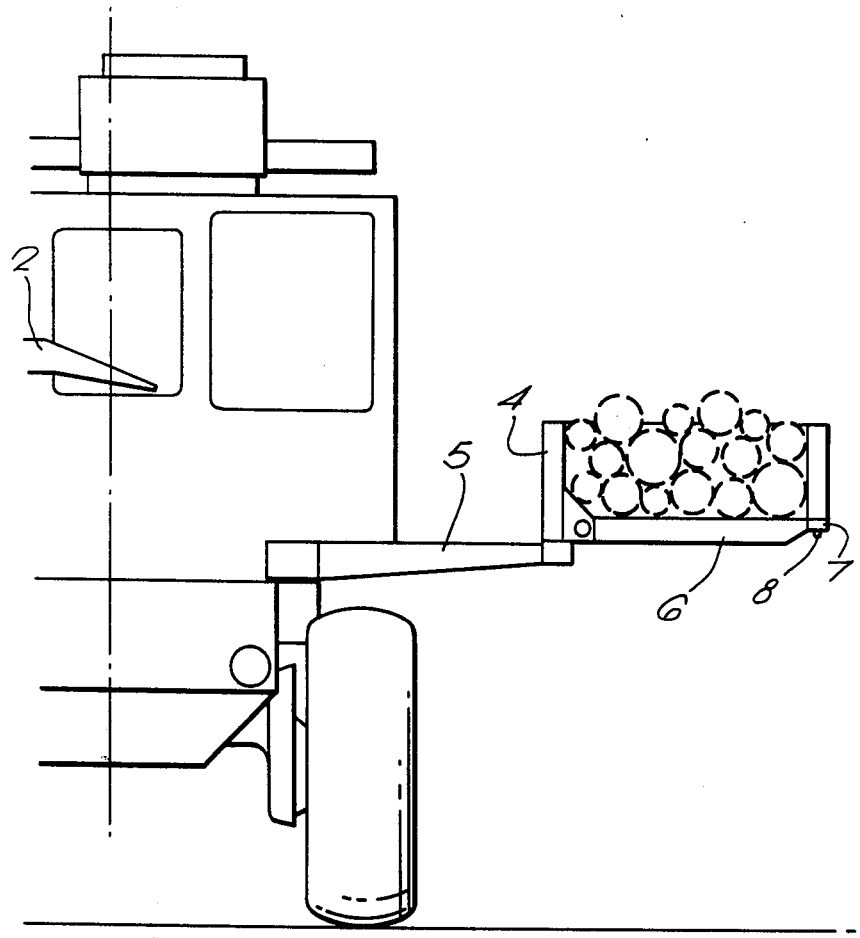
Figure 4:
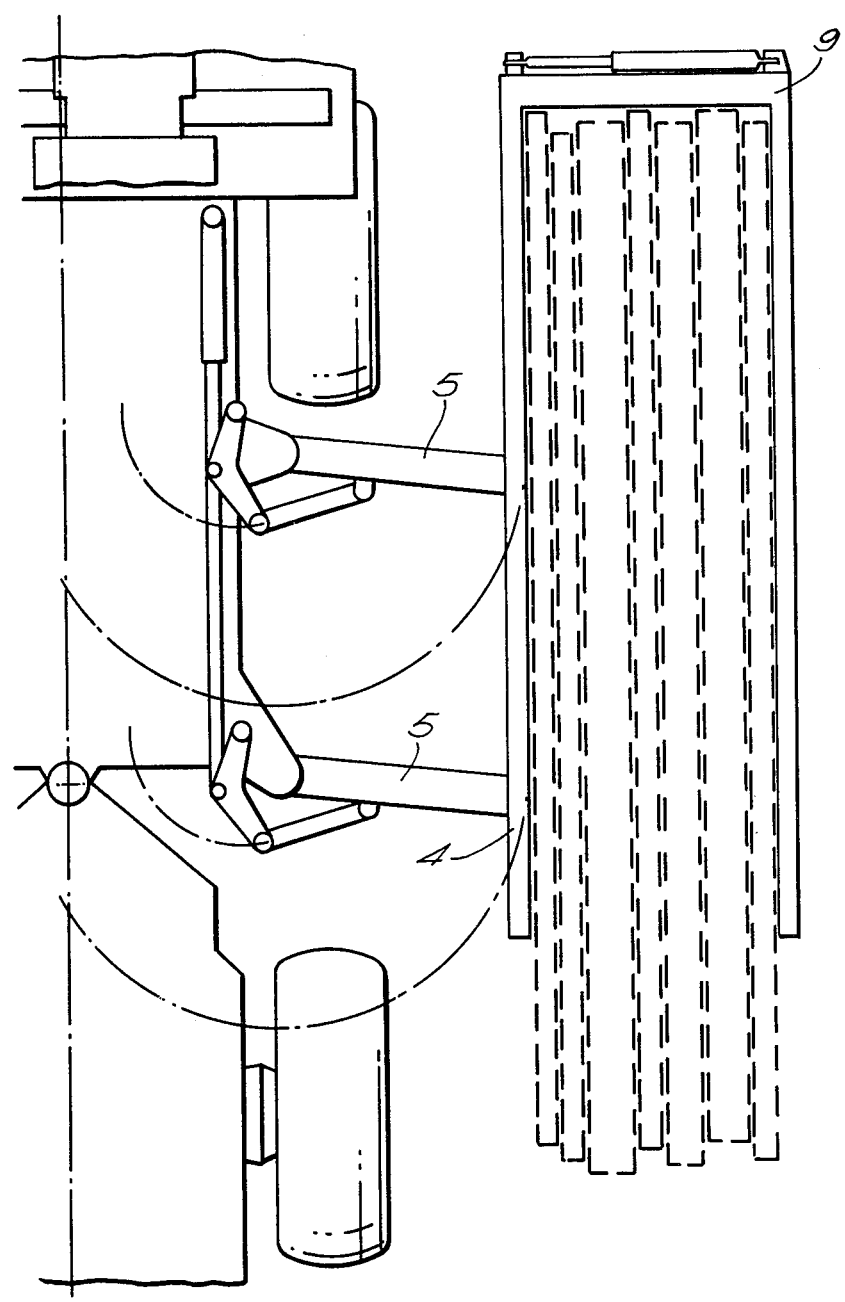
Figure 5:
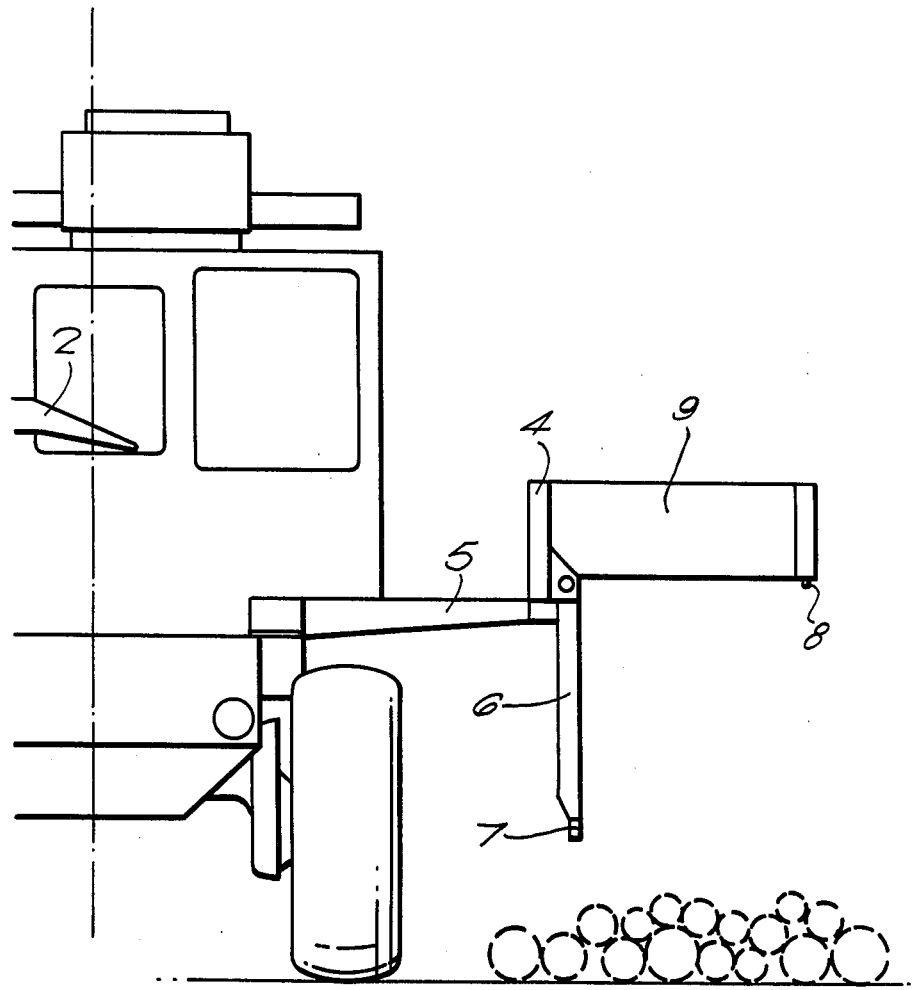

The construction and operating description of pocket system embodiments according to the invention are further illustrated in the following with reference to the accompanying drawings in which FIG. 1 shows a rear view of a tree harvesting apparatus provided with a pocket system according to the invention, with two pockets arranged symmetrically in relation to the centre line of the apparatus, the pockets in basic position, FIG. 2 shows a top view of the tree harvesting apparatus of FIG. 1, FIG. 3 shows one pocket moved to outside the side profile, FIG. 4 shows a top view of the position of FIG. 3, FIG. 5 shows the tree lot dropped from the pocket on the ground, FIG. 6 shows a rear view of an alternative to the pocket embodiment of FIGS. 1 to 5, and FIG. 7 shows a top view of the pocket embodiment of FIG. 6.

Trees coming from a handling line 1 are sorted by a sorting device 2 either onto the ground, into pocket 3 or pocket 4. When the pocket 4 has been filled, it is moved in a horizontal plane by means of levers 5 to outside the side profile of the apparatus (FIGS. 3 and 4) where the bottom 6 of the pocket is opened and the trees are allowed to fall onto the ground (FIG. 5). When the trees have been dropped, the bottom 6 is closed and the pocket 4 is moved by the levers 5 back to its basic position, whereafter the filling of the pocket is started again.

The ends of the product can also both be closed but in order to allow for a greater variation in the length of trees, one end is open in this embodiment. Because of this, the load applied to the other end 9 (FIG. 2) may increase as the trees tend to press the side walls of the pocket apart. In order to prevent this, one or several links 7 or the like can be fastened to the bottom 6 so that while the bottom 6 is closed, these links hold pegs 8 or the like fastened to the side wall on the outer side of the pocket. In this way, the load applied to the end 9 can be reduced.

In the pocket embodiment shown in FIGS. 6 and 7 and different from the one set forth above, a working cylinder 9' moves the pocket along guides 10 to outside the profile of the tree harvesting apparatus, whereafter the pressure in the positive side of a working cylinder 11 is released. The pocket 4 then is tilted around a pivot 12, outwards from the centre axle of the apparatus because the centres of gravity of both the trees and the pocket are between the pivot 12 and the opening side 13. When the pocket has been sufficiently tilted, the trees press the side 13 open and fall onto the ground. When the pocket has been emptied, the working cylinder 11 turns the pocket back to the horizontal position and closes the side 13 at the same time, whereafter the working cylinder 9' pulls the pocket 4 back to the filling position.

I claim:

1. A tree harvesting apparatus comprising:
   (a) a chassis;
   (b) wheels on both sides of the chassis forming a mobile vehicle with said chassis;
   (c) a tree collecting pocket movably mounted over said chassis on each side thereof, said pockets being limited to movement in a substantially horizontal plane;
   (d) separate lever means pivotably connected at one end thereof to each of said pockets;
   (e) vertical pivot means on said chassis for pivotably mounting the other end of said lever means to the chassis, thereby rendering each of said lever means and the pocket thereon rotatable about said vertical pivot means in a substantially horizontally disposed arc, each of said lever means being of sufficient length to extend the pockets mounted thereon to positions outside the profile of the tree harvesting apparatus; and (f) means for emptying the extended pocket whereby trees contained in said extended pocket will drop to the ground along the side of the tree harvesting apparatus.

2. A tree harvesting apparatus according to claim 1 wherein one end of each pocket is open so that the structure does not set restrictions on the length of trees to be collected into the pocket.

3. A tree harvesting apparatus comprising:
(a) a chassis;
(b) wheels on both sides of said chassis forming a mobile vehicle with said chassis;
(c) a tree collecting pocket for holding harvested trees;
(d) cooperating guide means respectively rigidly mounted on at least one side of said chassis and pivotably connected to said pocket to cooperatively provide a guide for permitting said pocket to extend in a substantially horizontal plane in a direction transverse to the longitudinal axis of said chassis to a position outside the profile of said apparatus and to pivot about an axis generally parallel to the axis of said chassis, said pivot axis located inward of the center of gravity of said pocket so that said pocket will have a tendency to pivot outward from the center axis of the apparatus to facilitate dumping of trees from said pocket;
(e) an openable transverse side for said pocket hingeably connected thereto;
(f) a working cylinder operatively connected between said pocket and said guide means, said working cylinder having a locking position for maintaining said pocket generally horizontal and for maintaining said side in closed position so that said pocket may retain the harvested trees, and said working cylinder having a dumping position for substantially simultaneously opening said side and pivoting said pocket to a dumping position; and
(g) drive means connected to said chassis and to said pocket for moving said pocket in a direction transverse to the longitudinal axis of said chassis and in a substantially horizontal plane over those wheels on the same side of said chassis as said pockets, said drive means being arranged to extend the pocket to a position beyond the outer edge of the wheels for dumping.

* * * * *